United States Patent [19]

Polchaninoff

[11] Patent Number: 4,503,705
[45] Date of Patent: * Mar. 12, 1985

[54] FLEXIBLE FORCE SENSOR

[75] Inventor: Michael Polchaninoff, Huntington, N.Y.

[73] Assignee: The Langer Biomechanics Group, Inc., Deer Park, N.Y.

[*] Notice: The portion of the term of this patent subsequent to Jan. 24, 2001 has been disclaimed.

[21] Appl. No.: 475,085

[22] Filed: Mar. 14, 1983

Related U.S. Application Data

[63] Continuation-in-part of Ser. No. 351,961, Feb. 24, 1982, Pat. No. 4,426,884.

[51] Int. Cl.$^3$ ........................................... H01C 10/10
[52] U.S. Cl. ................................... 73/172; 73/862.64; 338/47; 338/114
[58] Field of Search ................ 73/172, 862.64, 862.68; 338/47, 99, 114

[56] References Cited

U.S. PATENT DOCUMENTS 2,752,558  6/1956  Kane ..................................... 73/725
3,509,296  4/1970  Harshman et al. ................... 338/114
4,257,305  3/1981  Friend et al. ......................... 338/114

Primary Examiner—S. Clement Swisher
Attorney, Agent, or Firm—James & Franklin

[57] ABSTRACT

The flexible force sensor having an electrical conductor releasably attachable to a test site and a plurality of relatively spaced electrical contacts supported for varying contact with the conductor such that when a force is applied to the force sensor, the electrical contacts and electrical conductor move into and out of varying areas and/or paths of electrical contact to produce electrical resistances therebetween corresponding to the extent of such areas and/or paths and as a function of the applied force.

21 Claims, 25 Drawing Figures

FLEXIBLE FORCE SENSOR

RELATED APPLICATIONS

This is a continuation-in-part of U.S. patent application Ser. No. 351,961, filed Feb. 24, 1982 now U.S. Pat. No. 4,426,884, issued 1-24-84.

BACKGROUND OF THE INVENTION

This invention relates to a sensor. More particularly, the invention relates to an inexpensive disposable sensor that can be used to sense forces exerted by the human body during such movements as walking, jogging and in orthopedic testing.

In recent years studies of human gait by orthopedic testing involve the accumulation of quantitative measurements of the forces exerted by the foot against the ground. Such information has proven particularly effective in diagnosing and treating neurological and muscular abnormalities. Such studies are described in, for example, U.S. Pat. No. 2,290,387. Studies of the human gait have also been found useful in the diagnosis and treatment of orthopedic foot disorders. An example of such a study is described in L. F. Dragnich et al, *Measurement of Instantaneous Foot—Floor Contact Patterns*, Orthopedic Research Society, Orthopedic Transactions 1980, Vol. 4 #2 at p. 242.

Recently, human gait studies have been used for both diagnosis and treatment in sports medicine and biomechanics. These studies are used analytically to measure the force and movement generated by an athlete's foot during training and competition. Based on such measurements, special training exercises and techniques have been devised to improve the athlete's competitive performance.

A number of different types of measuring devices are employed to measure the forces exerted by a subject during movements, as in walking, running or the like. For example, U.S. Pat. No. 2,095,268 describes an orthopedic pressure sensing device which employs a fluid-containing diaphragm. As a subject stands and walks on the device, the pressure applied to the diaphragm is measured. Similar fluid-containing diaphragms are also described in two U.S. Pat. Nos. 2,192,435 and 3,974,491.

Electrical means for measuring human gait is taught in the above-mentioned U.S. Pat. No. 2,290,387. Piezoelectric mutlicomponent measuring platforms have been marketed for a number of years. For example, a quartz multicomponent measuring platform is marketed by Kistler Instruments A.G. of Wintertherm, Switzerland. More recently, multiaxial load cells employing small foil type strain gauges have been incorporated in a subject's shoe to measure gait. See, for example. H. S. Ranu et al, *A Study of Normal and Abnormal Human Gait With Miniature Triaxial Shoe-Borne Load Cells*, Orthopedic Research Society, Orthopedic Transactions 1980, Vol. 4 #2 at p. 240.

These prior art devices for measuring gait all have numerous disadvantages. For example, fluid filled diaphragm devices have proven inaccurate. Further, it has been found that devices which utilize either a platform or pad on which a subject stands, or a specially fitted shoe which must be worn by a subject, are cumbersome and difficult to use. Rigid or bulky sensors mounted in shoes or on the body are uncomfortable and this discomfort has been known to affect the validity of the test since it may affect a subject's movements or gait. Moreover, when the sensor is placed in a shoe, the shoe is specially modified to accommodate the sensor such that the shoe must be discarded after such special use.

It is therefore an object of the present invention to provide a durable force sensor of thin, planar, flexible construction.

It is another object of the present invention to provide a thin, flexible sensor for use in measuring the forces exerted by the human body which is comprised of two parts, one part being a permanent electrode and the other part being a conductive sensor pad adapted to be attached to the skin at a given test site and which is inexpensive so it can be discarded after use.

It is a further object of the present invention to provide a thin, flexible force sensor for use on the human body wherein the sensor is comprised of two parts detachably joined together so that that part of the sensor which is in immediate contact with the body can be discarded after use thereby to facilitate sanitary test procedures.

It is another object of the present invention to provide a pressure transducer adapted to measure forces exerted by the human body wherein the transducer is of minimal thickness, employs a change in electric resistance as a parameter corresponding to the applied force, and which is low in cost.

SUMMARY OF THE INVENTION

The present invention overcomes several of the above-noted drawbacks of prior devices. In general, and in the present invention, force measurement is accomplished by an induced change in the electrical resistance of the sensor system. This change in electrical resistance is in response to and in correspondence with the applied force. The inventive force sensor is an inexpensive two-part device and, as such, comprises a reusable permanent electrode platform and a flexible, relatively thin, inexpensive, elastomeric conductive sensor pad that may be disposable. The latter is intended to be releasably attached to a selected test site of a subject's skin.

In a first embodiment of the present invention, the permanent electrode includes curved or dome-like metallic contacts generally of hemispherical configuration supported thereon or embedded therein and adapted to touch or be closely positioned to electrical circuit engagement with the sensor pad when the pad and permanent electrode are detachably joined. When the permanent electrode is attached to or joined with the sensor pad, the curved or dome-like contacts are placed in facing opposition to the conductive sensor pad. When a compressive load is applied across the sensor, the sensor pad and metallic contacts are, to varying extents, pressed together, thus inducing a change in the surface area of contact therebetween.

The surface area of contact between the latter and former is proportional to or modulated by the applied force. When the magnitude of the applied force is relatively small, the surface area of engagement between each metal contact and an associated facing region of sensor pad is small. When the magnitude of the applied force increases, the sensor pad and contacts are driven more firmly together causing the sensor pad to envelop and engage the metallic contacts to a greater degree, thus increasing the surface area of contact between them. Small area of contact between the dome-like metallic contacts and conductive sensor pad equals a relatively high resistance, and conversely, large area of contact between the dome-like members and respective portions of the conductive sensor pad equals a relatively low resistance.

This change in resistance is easily monitored by appropriate instrumentation. When the test is completed, the electrode assembly is readily removed from the skin or test site. The disposable sensor pad is readily detached from the permanent electrode and discarded. A force sensor built according to the present invention can be constructed so as to be unusually thin and thus present a minimal feeling of presence or discomfort in use.

In a second embodiment of the present invention, the permanent electrode includes pairs of substantially flat metallic contacts supported thereon or embedded therein, the contact pair defining therebetween a geometric pattern of insulation. Each contact pair is adapted to touch or be closely positioned to electrical circuit engagement with the sensor pad when the pad and the permanent electrode are detachably joined. When the permanent electrode is attached to or joined to the sensor pad, the contacts are placed in facing opposition to the conductive sensor pad. When a compressive load is applied across the sensor, the sensor pad and metallic contents are, to varying extents, pressed together, thus inducing a change in the surface area of contact therebetween. Furthermore, the geometric pattern of insulation between the contacts of the second embodiment is selected so that, as the compressive load is applied across the sensor, there is a decrease in the distance through which current must flow in the sensor pad in order to bridge the contact pair. Thus, providing that the sensor pad is of greater electrical resistivity than the metallic contacts, an increase in the compressive load applied across the sensor will decrease the electrical resistance of the circuit independently of any change in the surface area of contact between the sensor pad and the metallic contacts.

Accordingly, in the second embodiment the change in electrical resistance resulting from the application of a compressive load across the sensor includes two components: one component deriving from the increase in the surface area of contact, and one component deriving from the decrease in the length of the mean flow path of current through the sensor pad. The cumulative effect of both components is to make the change in electrical resistance more nearly proportional to the change in the compressive force applied across the sensor so that the sensor of the second embodiment provides truer readings of the force variations than that of the first embodiment (which relied exclusively on changes in the surface area of contact). Furthermore as the hemispherical contacts of the first embodiment are replaced in the second embodiment by comparatively flat metallic contacts, the force sensors according to the second embodiment can be even thinner and more flexible than those of the first embodiment, so as to present even less of a feeling of presence or discomfort in use.

More particularly speaking, the sensor of the present invention comprises a member of dielectric material defined by inner and outer faces, with electrical contact means on the inner face of the dielectric member, and a flexible conductive member operatively connected to the dielectric member. The flexible conductive member has an inner face overlying the inner face of the dielectric member to cover the electrical contact means such that, when a compressive load is applied to the sensor, the load induces an increase in the surface area of contact between facing portions of the conductive member and the contact means to effect a change in the electrical resistance thereacross in proportion to the extent of the applied load.

Preferably the inner face of the dielectric member defines a recess for the contact means, the contact means being at least partially seated in the recess. The upper or inner extremity of the contact means is substantially at the level of the inner face of the dielectric member.

In the first embodiment, the contact means is of a curved configuration and is positioned on the dielectric member such that the curved portion thereof is oriented toward and for movement into and out of increased engagement with the conductive member in response to an increase or decrease of the compressive load applied to the sensor. Preferably there are a plurality of the contact means, each being of hemispherical shape, with electric leads being coupled electrically to each of the plurality of contact means to transfer current therefrom. The conductive member is movable into and out of increasing or decreasing electrical circuit completing engagement with and across the contact means according to the load applied to the sensor. In a variant of the first embodiment, there is but a single contact means and the electrical lead means are electrically coupled to each of the contact means and conductive member to transfer current therefrom.

In the second embodiment there are at least one spaced pair of contact means, and electrical lead means electrically coupled to each of the pair of contact means. Each pair of contact means defines therebetween a geometric dielectric pattern and is covered by the inner face of the conductive member. The conductive member is adapted for movement into and out of increased engagement with the contact means on opposite sides of the dielectric pattern in response to an increase or decrease of the compressive force applied to the sensor. Preferably the conductive member has an electrical resistivity different from that of the contact means and the pair of contact means are configured and dimensioned such that, when a compressive load is applied to the sensor, the load also induces a variation in the mean length of the travel path of current between the contact members of the pair through the conductive member. Preferably the conductive member has a greater resistivity than the contact means and the induced variation is a decrease in the mean length of the travel path. The geometric dielectric pattern preferably has a periphery sloping towards the centerline of the pair of contact members as the periphery approaches the centerline, and may be configured as a diamond.

A preferred force sensor of the present invention comprises a disposable, flexible, relatively thin, planar, electrically conductive member (also called a sensor pad) and a permanent, flexible, relatively thin member of dielectric material, one face of which is substantially planar and adapted to be detachably affixed to one planar face of the conductive member. Electrical contact means are provided on the one face of the dielectric member, and means are provided on the dielectric member for positioning the contact means facing the one planar face of the conductive member such that the extent of the electrical contact between the contact means and conductive member varies in accordance with the extent of the compressive load applied to the sensor to produce a corresponding electrical resistance therebetween. Means are also provided to join the conductive and dielectric members together, the joining means being releasable to permit their separation and the disposal of the conductive member.

Adhesive means may be disposed on one face of the disposable conductive member to electrically join the same to a test site, and adhesive means may also be disposed on the other face of the conductive member to releasably affix the same to the permanent dielectric member and to define a non-adhesive zone thereon. The dielectric member is oriented with respect to the other face of the conductive member so as to place the electrical contact means in facing opposition to the non-adhesive zone so that, when a compressive load is applied across the sensor, the load induces a change in the surface area of contact between the facing portions of the non-adhesive zone and the electrical contact means to correspondingly vary the electrical resistance thereacross.

The pressure transducer of the present invention comprises a dielectric electrode platform, with electrical contact means on the platform, and a flexible conductive member facing the contact means so that the same move into varying extents of engagement in accordance with a pressure applied to the same to effect an electrical resistance that is an inverse function of the pressure applied to the same. Electrical leads are connected with the transducer to permit the transmission of the electrical resistance.

The sensor of the second embodiment may comprise a member of dielectric material defined by inner and outer faces. At least one spaced pair of electrical contact means are disposed on the inner face, defining therebetween a geometric dielectric pattern. Electrical lead means electrically couple each of the pair of contact means. A flexible condutive member is operatively connected to the dielectric member and has an inner face overlying the inner face of the dielectric member to cover the contact means. The conductive member has an electrical resistivity different from that of the contact means, and the pair of contact means are configured and dimensioned such that, when a compressive load is applied to the sensor, the load induces a variation in the mean length of the travel path of current between the contact members of the pair through the conductive member. Preferably the conductive member has a greater electrical resistivity than the contact means, and the variation in the mean travel path of the current is a decrease therein.

BRIEF DESCRIPTION OF THE DRAWING

Other objects and features of the present invention will become apparent from the folloiwng detailed description considered in connection with the accompanying drawings. It is understood, however, that the drawings are designed for purposes of illustration only, and not as a definition of the limits of the invention for which reference should be made to the appending claims.

In the drawings, wherein the same reference numeral denotes the same element throughout the several views.

DETAILED DESCRIPTION OF THE PREFERRED EMBODIMENTS

Figure 1:
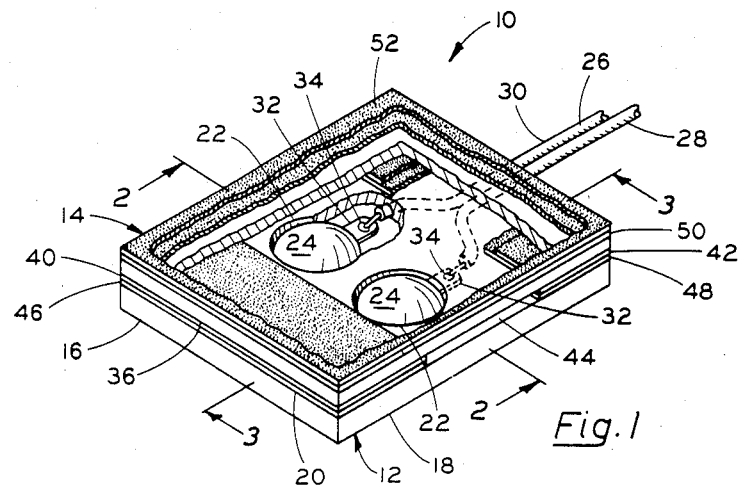
FIG. 1 is an enlarged perspective view of the inventive sensor or transducer assembled but with parts thereof broken away.
Figure 2:
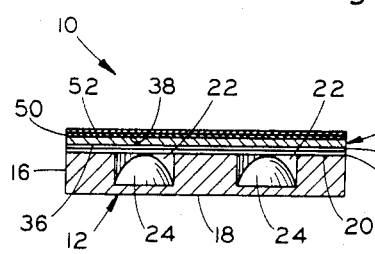
FIG. 2 is a cross-sectional view taken along the line 2—2 of FIG. 1 showing the electrical contacts of the permanent electrode.
Figure 3:
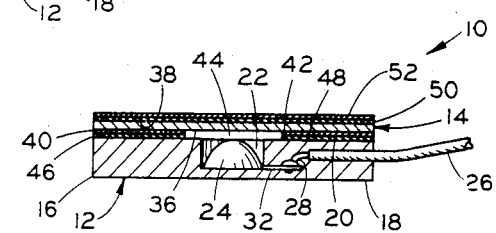
FIG. 3 is a cross-sectional view taken along the line 3—3 of FIG. 1.
Figure 4:
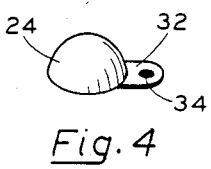
FIG. 4 is a perspective view of an electrical contact employed as part of the permanent electrode.
Figure 5:
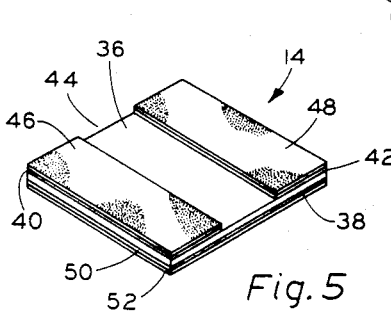
FIG. 5 is a perspective view of the inner or electrode-facing side of the assembled disposable sensor pad.
Figure 6:
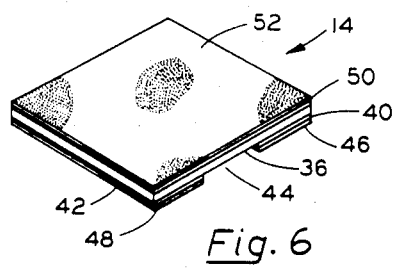
FIG. 6 is a perspective view of the outer side of the sensor pad of FIG. 5.
Figure 7:
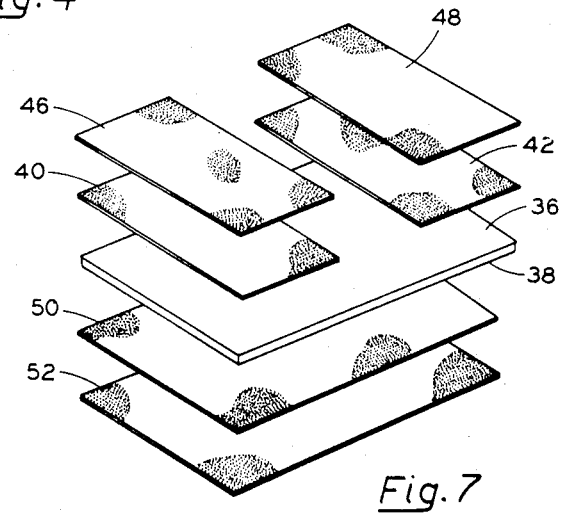
FIG. 7 is an exploded perspective view of the sensor pad seen in FIG. 5.

Referring to FIGS. 1 through 12, the force sensor of the present invention is indicated generally by the reference numeral 10. Sensor 10 is comprised of two complementary sized mating members or parts. One is a permanent reusable electrode generally identified by numeral 12 and the other is a disposable conductive sensor pad generally identified 14 that is detachably, yet adhesively, bonded or otherwise joined to the test site of a selected part of the body. Permanent electrode 12 is preferably formed as a relatively thin member 16 of inexpensive non-conductive elastomeric material and is defined by two spaced substantially planar faces 18 and 20.

The member 16 of the permanent electrode 12 is substantially planar, made relatively thin, sheet-like and flexible so as to conform to the bending movements of the skin or test site of a human to which the same is attached, thereby avoiding interference with the comfort of the wearer. In practice, it has been made of a soft, compressible, flexible urethane elastomer of the type manufactured by E. P. DuPont De Nemours Company of Wilmington, Del. The urethane elastomer is well suited for its intended purpose because it has the characteristics of silicone rubber and is a dielectric material that functions as an electrical insulator. The structure 12 is here referred to as the permanent electrode for convenience only because it is intended to be reused, whereas the conductive pad 14 is intended to be disposed of or thrown away after only one use for sanitary reasons.

The member 16 may be molded with one or more positioning means 22 defined or formed therein that may take the form of wells or sockets that open at and communicate with the inner face 20. These positioning means 22 are apertures that function to mount or support one or more of a plurality of electrically conductive contact elements 24 in insulating spaced relationship. As the description proceeds, it will be clear that the contacts 24 may be molded integral with the member 16 so as to be formed as a unitary part thereof. In the present embodiment there are two such positioning means 22 with each properly containing a respective contact element 24 therein.

Figure 11:
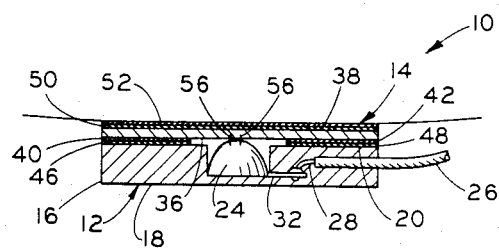
FIG. 11 is a cross-sectional view of the sensor as shown in FIG. 3 attached to a test site as in FIG. 10 to illustrate its details when no pressure is applied.

The contact elements 24 each are formed of a conductive material that has a curved outer surface facing outward from its positioned, supported end and extends toward the opening of its respective aperture or well 22. For each of description, the extent and form of curvature or shape of the contact elements 24 may be described as domed or hemispherical, with the smallest area of the curve thereof being at or substantially in or beyond the plane of that of the inner face 20. When the contacts extend outward and beyond the plane of the inner face 20, it is possible that the curved dome of the contact 24 may or may not be in initial touching or electrical engagement with the adjacent face of the conductive pad 14 as shown in FIG. 11, depending upon the needs of the user.

An electrical lead 26 is electrically connected to each of the contact elements 24 by a respective one of the electrical wire conductors 28 and 30. To enhance the connection, each contact element 24 is provided with an extension 32 formed as a part thereof and having a wire receiving hole 34 therein in which the wire is received and to which the same may be soldered. The other ends of the wires 28 and 30 of the lead 26 may be electrically coupled to an appropriate monitor and/or instrumentation (not shown) to receive an indication of the flow of current or electrical resistance produced by the sensor 10. When the contacts 24 are molded with and as a unitary part of the dielectric member 16, their tab extensions 32 and connecting wires 28 or 30 will be permanently embedded in and molded as a part thereof.

The conductive sensor pad 14 is made relatively thin and may be even thinner than the member 16. In practice, it may be convenient to mold or cut out the same from a thin sheet of carbon impregnated silicone rubber so the same has two relatively spaced, substantially planar faces. The inner face 36 of the pad 14 is disposed facing the inner face 20 of the member 16 and may be positioned for electrical conducting engagement with the contacts 24 of the member 16. The outer face 38 of the sensor pad 14 will be positioned for attaching or affixing the sensor assembly 10 to a selected test site in the manner as will be described. In practice, the sensor pad 14 is made of a carbon impregnated silicone rubber material that functions as an excellent electrical conductor without restricting or inhibiting its flexibility.

Because of the poor bonding characteristics of silicone rubber, present known adhesives makes it difficult to apply adhesive tapes to the slippery surfaces of the silicone rubber that will enable it to be removably adhered directly to other surfaces, as the skin of the test site of a human. To overcome this problem, two discrete layers of double sided adhesive interface tapes 40 and 42 are applied to the inner face 36 in such manner as to define an exposed zone 44 on the face 38. The zone 44 provided by the double sided spaced tapes 40 and 42 defines an area at which electrical contact can and is made between the conductive pad 14 and the contact elements 24 during use and during operation of the sensor 10 as will be described.

Applied to the outer or exposed face of each tape 40 and 42 are complementary sized shaped and zone producing double sided tapes 46 and 48. Tapes 46 and 48, suitable for removable adhesion to the skin of the test site, may be comprised of such double sided tape known as Model No. 444 sold by Minnesota Mining and Manufacturing Company. Each such double sided tape 46 and 48 fits over and precisely covers respective tape layers 40 and 42 thereby maintaining the exposure of the zone 44.

The other outer face 38 of the sensor pad 14 is also coated with a double sided adhesive interfaced tape 50, preferably of the same construction as the interfaces 40 and 42. An outer complementary sized double sided tape 52 of the same material as the tapes 46 and 48 is adhered to the interface 50. Since the conductive sensor pad 14 is supplied as a discrete adhesively coated member to be discarded after use for sanitary reasons, it may packaged separately from the assembled permanent electrode structure 12 with the exposed surfaces of the tapes 46, 48 and 52 protected by a releasable sanitized backing (not shown) or the whole may be contained within a sanitary or sterilized envelope or enclosure.

Figure 8:
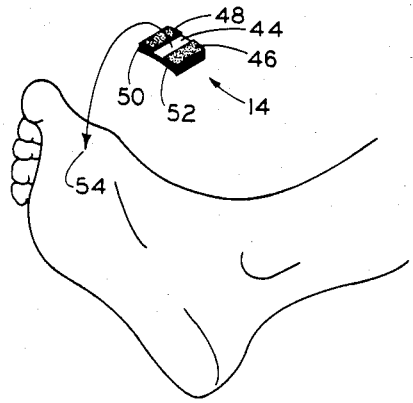
FIGS. 8, 9 and 10 are each diagrammatic perspective views showing the selection of a test site on the body and how the inventive sensor is attached to the test site.
Figure 9:
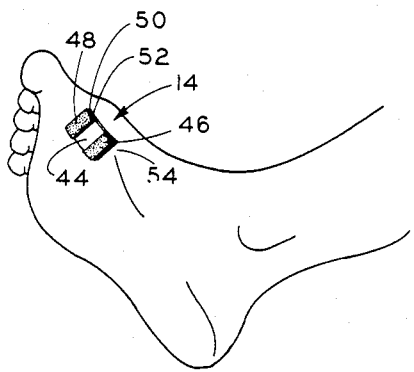

Referring now to FIGS. 8 through 12 inclusive, when a selected test site 54 is chosen on a portion of the body as illustrated in FIG. 8, the skin thereat is cleaned and sterilized in the usual manner. Assuming that the sensor pad 14 is not already affixed at 36 to the permanent electrode 12, it is removed from its packaging. It is then ready to be adhered to the inner face of the permanent electrode 12 at its zone defining double sided adhesive tapes 46 and 48. When so adhered to the inner face 20 of the permanent electrode 12, the assembly of the whole sensor 10 is complete to enable the same to be applied as a unit to the selected test site 54 on the skin.

Figure 10:
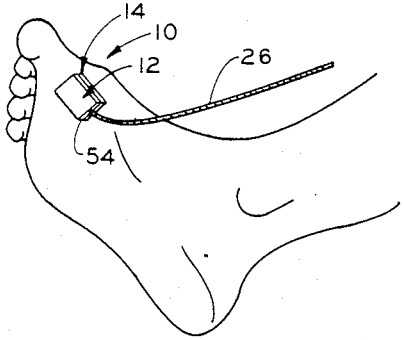

This is done by pressing the exposed adhesive surface of the tape 52 against the skin to cause the sensor 10 to adhere to the test site 54 as is shown in FIG. 10. When the zone defining tapes 46 and 48 are pressed into engagement with the inner face 20, the zone 44 is aligned with and positioned for engagement with the contact elements 24 of the electrode 12. This positions the smallest curved area 56 of the domes of the contacts 24 in or proximate to the zone 44 of the sensor pad 14 for touching engagement therewith.

Figure 12:
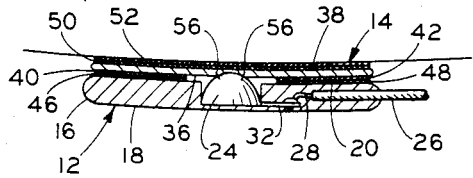
FIG. 12 is a view similar to FIG. 11 and illustrating the sensor when pressure is applied.

An electrical potential that is placed across the leads 28 and 30 will cause a current to flow when electrical engagement is made between the contacts 24 and the pad 14. When no pressure is applied across the sensor 10, and the contacts 24 are out of engagement with the zone 44 of the pad 14, no current will flow therebetween. As a force or pressure or compressive load is applied to the sensor 10, the contacts 24 and the pad 14 are moved into electrical engagement with each other. The sensor pad 14 experiences a lateral distention and enlarging envelopment of the contacts 24 as shown by the area of contact 56 as the curve of the dome of each of the contacts 24 and the associated engaging zone 44 of the sensor pad 14 are driven more firmly into engagement with each other as shown in FIG. 12. This effects a concomitant varying increase in the surface area of contact between the contacts 24 and the sensor pad 14 as seen by the increased area or extent of the contact lines 56 from that of FIG. 11 to FIG. 12.

As the area or extent of electrical contact increases, there is a resultant lowering of electrical resistance to the flow of current between the contacts 24 and the pad 14. This provides for and enables an increase in the flow of current through the contacts 24 of the sensor 10. Hence, the compression, force or pressure applied to the sensor 10 modulates and effects a change in its electrical resistance. Leads 28 and 30 apply and transmit this change in resistance or change in current flow to the appropriate monitoring apparatuses or instrumentation (not shown) with which they are connected.

When testing is finished and the need for the sensor 10 is completed, the sensor 10 may be removed from the test site 54 in any desired manner. This may be done by peeling the sensor 10 as a whole from the skin and then disposing of the pad 14 by peeling it from the electrode 12. Alternatively, the electrode 12 may be unpeeled from the sensor pad 14 at the adhesive tapes 46 and 48 while the pad 14 remains in its engagement with the skin of the body at the test 54 as in FIG. 9. The disposable sensor pad 14 then may be separated from the site 54 at the adhesive tape 52. This enables the reuse of the uncontaminated permanent electrode 12 because it is always free of touching contamination contact with the skin. Its reuse is enhanced by the application of a new sanitary sensor pad 14 to the same in the manner as previously described. This results in providing a permanently reusable sanitary electrode 12 that is available for affixation to and with inexpensive disposable electrode sensor pads 14.

In practice, it has been found that the change in the electrical resistance experienced by the sensor 10 is not an inverse linear function of the applied pressure, but is substantially exponential. Typically, this electrical resistance change varies from 1000 ohms to 100 ohms as the sensor 10 is actuated from a no-load condition to a maximum load condition. Indeed, the no-load or unloaded resistance can be an open circuit condition by simply assuring that the height or contact of the curved domes 24 are positioned away from initial electrical conductive engagement with the conductive sensor pad 14. By predeterminately controlling the geometry of the contacts 24 and their engagement with the sensor pad 14, the change of resistance with applied pressure can be made to assume other functions.

It is within the contemplation of the present invention that the geometric arrangement of the contacts 24 may be varied from that disclosed in the embodiment illustrated in FIGS. 1 to 12 inclusive. Further, the arrangement of the electrical connections and their leads may be revised in accordance with the teaching of the invention. This is illustrated more fully in the embodiment shown in FIG. 13.

Figure 13:
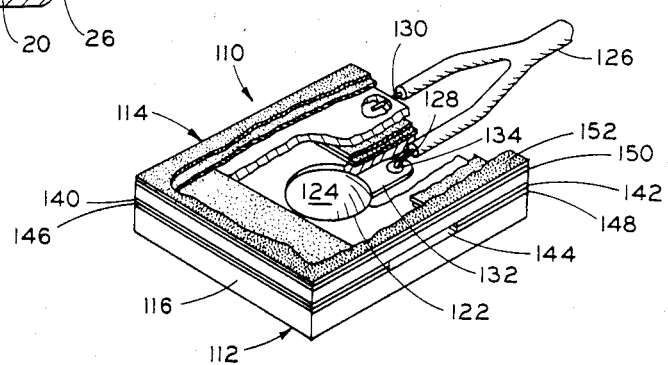
FIG. 13 is an enlarged perspective view of another embodiment of an assembled force sensor constructed according to the present invention with parts broken away.
Figure 14:
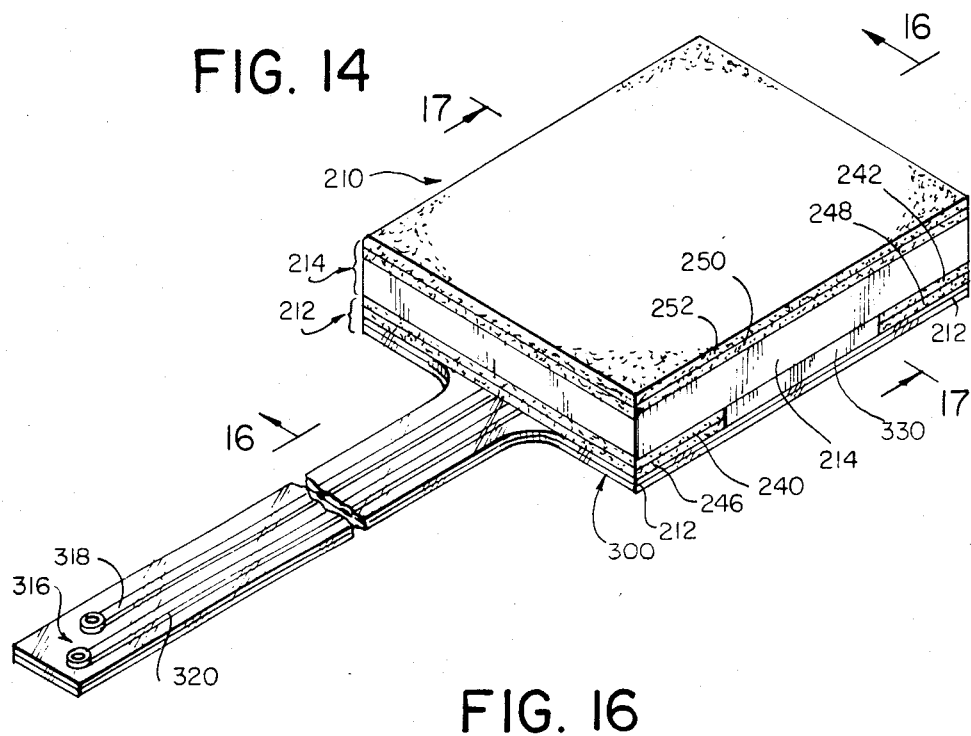
FIG. 14 is an enlarged perspective view of a second embodiment of the sensor or transducter.
Figure 16:
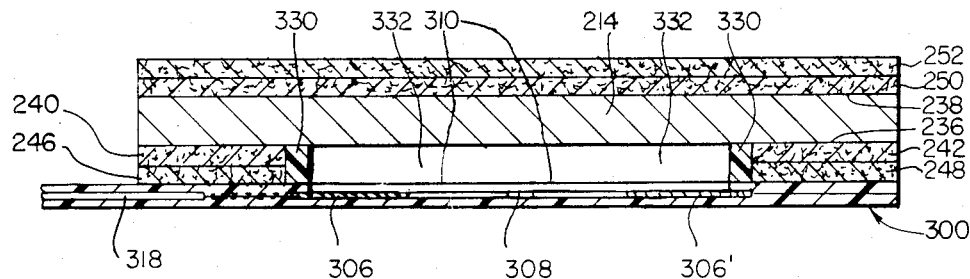
FIG. 16 is a fragmentary cross-sectional view taken along the line 16—16 of FIG. 14.
Figure 17:
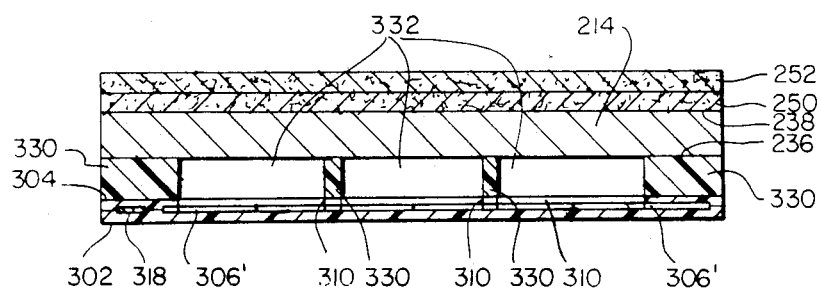
FIG. 17 is a cross-sectional view taken along the line 17—17 of FIG. 14.
Figure 15:
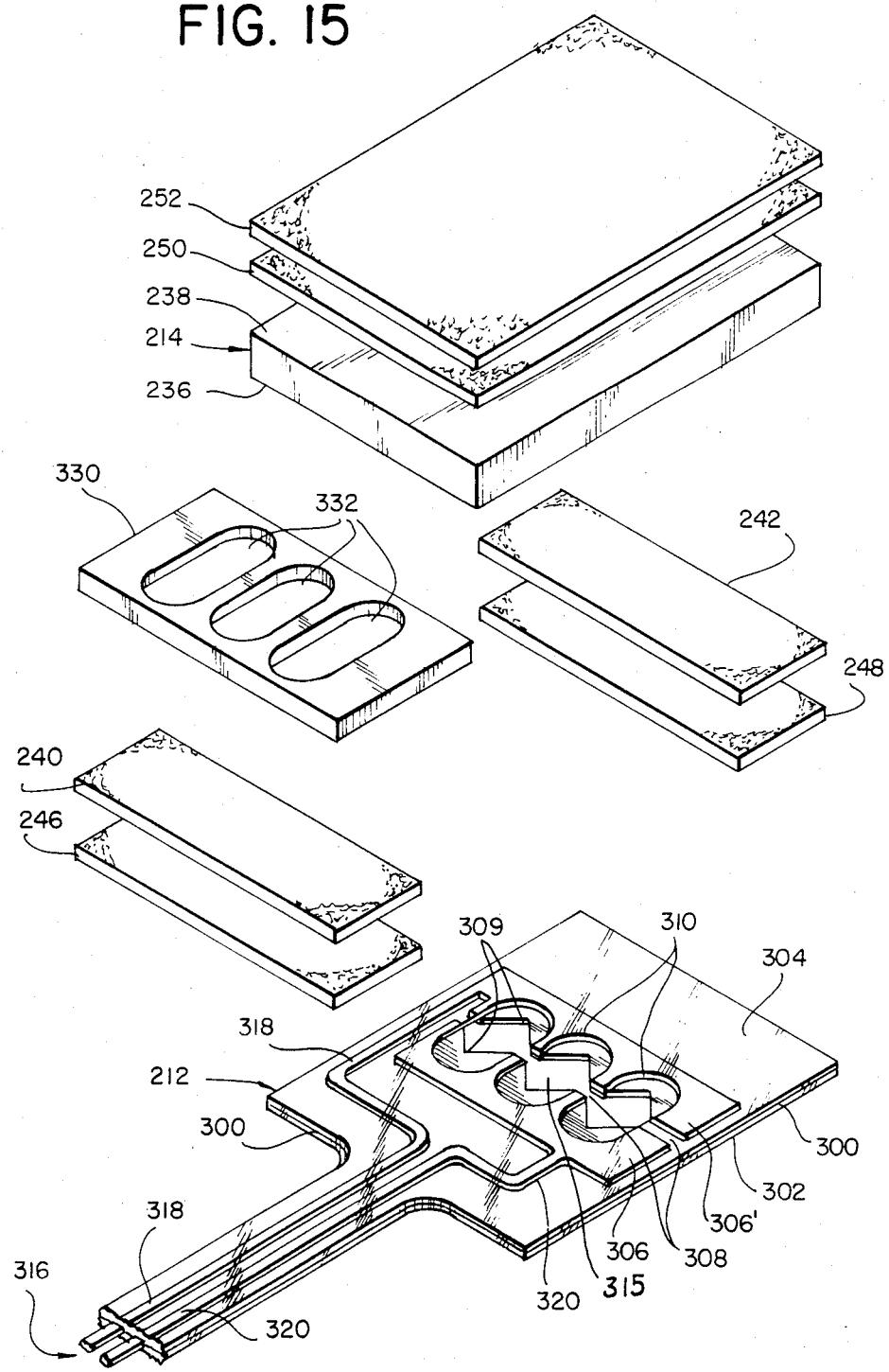
FIG. 15 is a fragmentary exploded perspective view of the sensor seen in FIG. 4.

The variant of the first embodiment shown in FIG. 13 illustrates a force sensor assembly generally identified by the numeral 110. For ease of understanding and simplicity of description, correlation between the variant embodiment 110 and that of the previously described embodiment 10, the structural elements contained in the variant embodiment will be identified by numerals in the 100 series. The 10's digits thereof will correspond as closely as possible to the 10's digits used to identify like elements in the embodiment 10.

As in the first embodiment 10, the permanent electrode of the present sensor 110 is generally identified by the numeral 112 while the sanitary disposable electrode is generally identified by the numeral 114. Because like parts of the variant embodiment are related by 10's digits to those of the first embodiment 10, it is possible to omit a description of such parts since the same will conform substantially to that already described with respect to the description of the embodiment 10. The permanent electrode 112 includes a non-conductive member 116 that is shown provided with a single electrical contact 124 positioned thereon rather than the double electrical contacts described with respect to the embodiment 10.

The single electrical contact is identified by the numeral 124 and, as in the prior described embodiment, it has a curved geometry or configuration facing in the direction of the engageable deformable surface 144 of the electrically conductive sensor pad 114. This assures that, as a compression, force or pressure is applied to the sensor 110, the conductive sensor pad 114 will come into greater distorting and enveloping surface and area engagement with the curved surface of the electrical contact 124 of the permanent electrode 112, thereby to reduce the electrical resistance to the flow of current between the pad 114 and the contact 124. The structural details of the variant 110, being very much like those of the embodiment 10, will not be described other than to indicate that in the variant embodiment the two wire electrical lead 126 has its conductors 128 and 130 connected across the contact 124 and the electrically conductive sensor pad 114. Thus, the lead 128 is connected with the contact 124 while the lead 130 is electrically conductively connected with the sensor pad 114.

Because the present force sensor 110 functions in essentially the same manner as the first embodiment 10, a description of the same would be redundant. The differences between the two sensors reside in the use in the first described sensor 10 of the plurality of the electrically conductive contact elements 24 supported on and forming an integral part of the permanent electrode 112. Current transmitted through the contacts was then conveyed or supplied to an associated connected apparatus or instrumentation by way of the electrical lead 26 connected with each of the contact elements.

The variant sensor embodiment 110 differs therefrom in that only one of the conductors 128 of the electrical lead 126 is connected with the electrical contact 124 forming a part of the permanent electrode 112. The second lead 130 of the electrical lead 126 is connected directly with the sensor pad 114. Thus, when the sensor pad 114 and the electrical contact 124 engage with each other and an electrical potential is applied across such leads, current will flow in proportion to the extent of contact or area between the two elements that are engaged with each other. The greater the area of contact, the lower is the resistance to the flow of current across the leads of the wire 128.

Although in practice the sensor pad 114 may be disposable in the same manner as described with respect to the first embodiment 10, it is more reasonable to assume that the present embodiment 110 may be reused as a completed assembly. In the event the same is reused as a completed assembly, the same may be subjected to sterilization procedures to assure that the application of the sensor pad 114 to the skin at the outer adhesive surface 152 will effect a sterile adhesion therebetween.

In the event the sensor pad 114 of the embodiment 110 is intended to be disposable, the same will be connected with the permanent electrode 114 in the same manner as previously described by the use of double sided pressure sensitive adhesive tapes 140, 142, 146, 148, 150 and 152. In the event the force sensor assembly 110 is to be used as a permanent structure wherein the sensor pad 114 forms an integral working part of the permanent electrode 112, it is then possible to bond the same together and to eliminate the need for the connecting double sided adhesive tapes 140, 142, 146 and 148.

Referring now to FIGS. 14–23, there illustrated is a second embodiment of the present invention comprising a force sensor assembly generally designated by the numeral 210. For ease of understanding and simplicity of description, and for correlation among the present second embodiment 210, the first embodiment 10, and the first embodiment variant 110, the similar structural elements contained in the present embodiment 210 will be defined by numerals in the 200 series. The 10's digits thereof will correspond as closely as possible to the 10's digits used to identify like elements in the first embodiment 10 and its variant 110. Different structural elements contained in the present embodiment will be defined by numerals in the 300 series.

As in the prior embodiments, the permanent electrode of the present sensor 210 is generally identified by the numeral 212 while the sanitary disposable electrode is generally identified by the numeral 214. Because like parts of the present embodiment are related by 10's digits to those of the prior embodiment 10, it is possible to omit the description of such parts since the same will conform substantially to that already described with respect to the description of the first embodiment 10.

The disposable electrode or sensor pad 214 of the second embodiment is essentially identical to that of the first embodiment. The double sided pressure sensitive adhesive tapes 250 and 252 disposed on the outer face 238 of the conductive pad 214 and the pairs of double sided pressure-sensitive adhesive tapes 240, 246 and 242, 248 disposed on the inner face 236 thereof are identical to the counterparts in the first embodiment.

It will be appreciated that while the conductive pad 14, 114, 214 has been described heretofore as being made of a carbon impregnated silicone rubber material, other materials are also suitable. For example, rubber materials of other types are also suitable. For example, the rubber material need not be impregnated in order to provide conductivity throughout the material, but may merely have a conductive coating on the face adapted to engage the contact elements. For example, a thin layer of industrial standard neoprene may be sprayed on one face with a conductive acrylic paint in order to provide the desired electrical conductivity without restricting or inhibiting the flexibility of the rubber. A suitable conductive acrylic paint is sold under the tradename Acrylic 100 by Technit Inc. of Cranford, N.J. Such an acrylic-coated neoprene offers cost advantages relative to carbon-impregnated silicone rubber and is also more easily bondable to pressure-sensitive adhesives. Accordingly, in some applications, it is possible to utilize with the acrylic-coated neoprene a single adhesive layer in place of the double adhesive layers 50, 52 or 40, 46 or 42, 48 or their counterparts in the other embodiments.

The permanent electrode 212 comprises a dielectric member generally designated by the numeral 300. (An element numeral in the 300 series indicates the absence of any exact counterpart element in the other embodiments.) The dielectric member 300 is substantially planar, made relatively thin, sheet-like and flexible so it can conform to the bending movements of the skin or test site of a human to which the same is attached, thereby avoiding interference with the comfort of the wearer. The dielectric member 300 is formed of inexpensive, non-conductive elastomeric material, preferably transparent, and defines two spaced substantially planar faces 302 and 304. Embedded within the dielectric member 300 are two discrete and separate conductive inserts 306, 306', each of generally rectangular configuration. Each insert is substantially planar, relatively thin, sheet-like and flexible, like the dielectric member 300 in which it is embedded. The conductive inserts 306, 306' are disposed in a common horizontal plane vertically spaced from one another along the length of the dielectric member 300 by a gap 308, and extend substantially across the width of the dielectric member 300. The facing surfaces thereof define oppositely directed triangular notches or cutouts 309, thereby to form three pairs of associated contact elements 314.

The upper or inner layer 304 of the dielectric member 300 defines atop each insert 306, 306' one or more access means 310, which may take the form of wells or sockets that open at and communicate with both the plane of the remainder of the inner face 304 above and the associated conductive insert 306, 306' below. These access means 310 are preferably oval-shaped apertures that each function to expose an associated pair of the electrically conductive elements 314, each one of the pair being in insulating spaced relationship with the other by virtue of gap 308. In the second embodiment illustrated there are three latitudinally spaced such access means 310 on each insert 306, 306', with each such access means 310 exposing an associated pair of contact element 314 therein.

The conductive inserts 306, 306' and hence the contact elements 314 are formed of a conductive material such as a metal, for example, copper. To minimize tarnishing and corrosion of the contact elements 314 the exposed upper and facing surfaces may be given a very thin, even monomolecular, layer of protective coating such as tin. The effect of the protective coating on the conductivity of the contact elements must, of course, be taken into consideration and, if desired, may be used advantageously.

The contact elements 314 operate in associated pairs, and a pair is best described as forming an oval, from the center of which a diamond shaped portion 315 has been removed to separate the two contact elements 314. Each access means 310 is adapted to expose one pair of these contact elements 314, allowing access to the contact element 314 and gap 315. As the two inserts 306, 306' are slightly longitudinally spaced from each other, each pair of longitudinally spaced contact elements 314 cooperatively define therebetween a geometric pattern 315 having the general configuration of a diamond, except that the tips thereof extending towards the sides of the permanent electrode 212 have been truncated and merge with the gap 308. The diamond pattern 315, like the gap 308, is occupied by air, a dielectric material acting as an electrical insulator. If desired, a more solid dielectrical material may be used instead of air. While a diamond-shaped pattern 315 of insulation between an associated pair of contact elements 314 is preferred, clearly any pattern may be employed wherein the periphery of the pattern slopes towards the centerline of the pair of contact elements 314 as the periphery approaches the ends of the centerline (that is, the closest approach of the contact elements).

In order to space the inner or lower face 236 of the conductive member 214 above the opposed upper faces of the contact elements 314, a spacer 330 is secured to the inner face 304 of the permanent electrode 212. The spacer 330 is formed of a dielectric material that functions as an electric insulator and is substantially planar, made relatively thin, sheet-like and flexible, like the dielectric member 300 to which it is secured. It is, however, sufficiently thick so that it may be considered bendable, but not compressible. The upper or inner surfaces of the contact elements 314 are disposed below the horizontal plane of the access means 310 (and hence below the upper surface 304 of dielectric member 300), and thence terminate substantially below the horizontal plane of the upper or inner surface of the spacer 300. The upper or inner surface of the spacer 300 supports the conductive pad 214 thereabove so that, in the absence of a compressive force thereon, the conductive pad 214 is spaced above and apart from the contact elements 314. In order to enable the conductive pad 214 to enter into a conductive relationship with the contact elements 314 when a compressive load is applied to the sensor 210, spacer 300 is provided with three latitudinally spaced oval cutouts or apertures 332 extending through the full thickness thereof and positioned so that the ends thereof are aligned with the curved end surfaces of an associated access means 310 and hence about the curved ends of an associated pair of contact elements 314.

The thickness of the non-compressible spacer determines the resistance to force which must be overcome by the compressive load before any current flows in the circuit. The spacer 330 is generally on the order of a few thousands of an inch in thickness. Where very high compressive forces on the sensor assembly are anticipated, a relatively thick spacer 330 should be employed so that only after substantial compressive force has been applied to the sensor assembly does the sensor pad 214 enter into the apertures 332 and access means 310 to commence bridging of the gap 315 between the contact elements 314. Where lower compressive forces are anticipated, the sensitivity of the sensor assembly is increased by employing a relatively thin spacer 330 so that the conductive sensor pad 214 commences to bridge the gap 315 between contact elements 314 when a much lesser compressive force is applied. Indeed, in applications where great sensitivity is required, the spacer 330 may be dispensed within its entirety and the thickness of the access means 310 exclusively relied upon to bias the sensor pad 214 away from the contact elements 314.

While the contact elements 314 have been illustrated as merely being portions of the conductive inserts 306, 306', it is also possible for the contact elements 314 to have solder or other conductive material secured to the top surface thereof. The resultant contact element/solder combination effectively extends further upwardly towards, and if desired even beyond, the upper face 304 of the dielectric member 300, while still terminating below the upper face of the spacer 330. Increasing the effective thickness of the contact elements 314 has the same effect as decreasing the thickness of the spacer 330; both render the sensor assembly more sensitive so that even very light compressive forces are effective to force the conductive sensor pad 214 into operative electrical communication with opposed contact elements 314.

An electrical lead, generally designated by the numeral 316, is electrically connected to each of the conductive inserts 306, 306' by a respective one of the electrical conductors 318 and 320 embedded in the dielectric member 300. The electrical conductor 318 extends to the insert 306' (at the far end of the permanent electrode member 212) and is in operative electrical communication with the electrical contacts 314 associated with that insert 306', while the electrical conductor 320 extends to the insert 306 on the near end of the permanent electrode 212 and is in operative communication with that insert's contacts. The other ends of the electrical conductors 318 and 320 of the lead 316 may be electrically coupled to an appropriate monitor and/or instrumentation (not shown) to receive an indication of the flow of current or electrical resistance produced by the sensor 210.

To facilitate its manufacture, the dielectric member 300 is preferably a laminate having a lower or outer layer defining the face 304. During manufacture, a very thin solid sheet of copper is laminated onto the upper face of the lower layer. Conventional photoresist etching techniques are employed to reduce the copper layer to the desired shape of the conductive inserts 306, 306' (each including their respective electrical conductors 320, 318 and contact elements 314). The upper layer is drilled out to provide access means 310 therethrough. Finally, the bottom face of the upper layer is laminated to the upper face of the lower layer, with the remnants of the copper layer being disposed therebetween.

Figure 23:
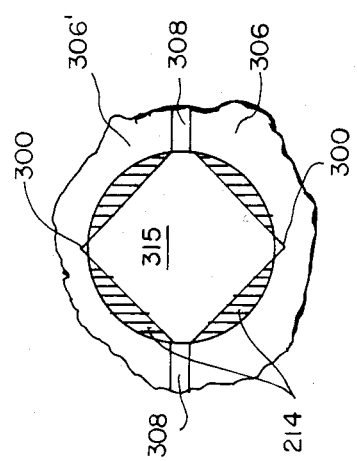
FIGS. 19, 21 and 23 are fragmentary schematic plan views, corresponding to FIGS. 18, 20 and 22, showing in hatched areas the surface areas of electrical contact between the contact element means and the conductive member as increasing compressive force is applied to the sensor.
Figure 21:
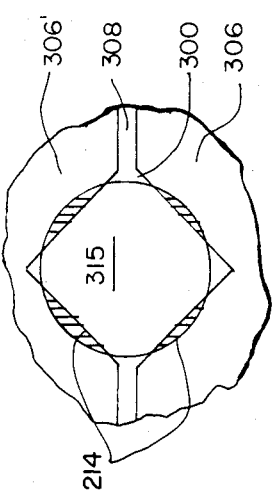
Figure 19:
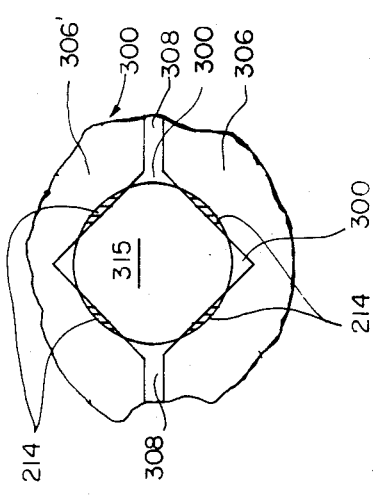
Figure 22:
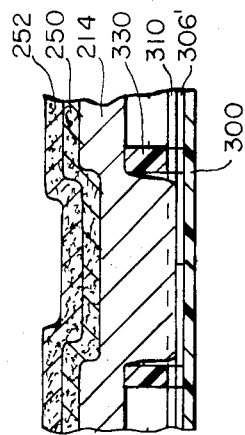
FIGS. 18, 20 and 22 are each greatly enlarged fragmentary cross-sectional views taken along a line parallel to line 17—17 of FIG. 14, as increasing compressive force is applied to the sensor.
Figure 20:
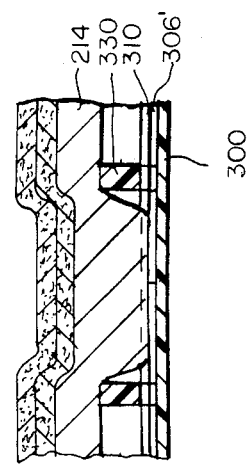
Figure 18:
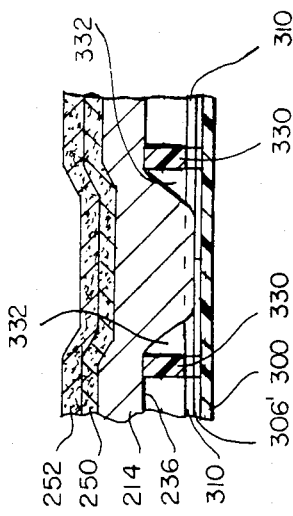

FIGS. 18, 20 and 22 are fragmentary plan views of the sensor, to a greatly enlarged scale, illustrating how, as successively greater compressive loads are applied across the sensor, the conductive member 214 is forced further into the apertures 332 of spacer 330 and hence into increasing surface contact with the upper surface of electrical contacts 314. FIGS. 19, 21 and 23 are schematic plan views corresponding to FIGS. 18, 20 and 22, wherein the areas of surface contact between the lower surface 236 of the conductive pad 214 and the upper surface of the contact elements 314 is represented by the hatched portion about the diamond 315. FIGS. 19, 21 and 23 illustrate that, as increasing compressive force is applied to the sensor, the area of surface contact not only increases, but approaches the gap 308 constituting the center line of the associated contact element pair. This results in a decrease in the mean travel path of current between the electrical contacts 314 through the conductive member 214 bridging the gap 308. FIG. 19 shows that, for current to flow between an associated pair of conductive elements 314, the current must travel through the conductive member 214 a distance substantially in excess of the width of gap 308. FIG. 21 shows the distance being somewhat diminished, and FIG. 23 shows the distance through which the current must flow in the conductive member 214 at a minimum equal to the length of the gap 308 itself.

Where the conductive pad 214 and the contact elements 314 are of the same resistivity, the lengths of the mean travel path of current through the conductive members is of no concern as there is equal resistance to flow through the contact elements 314 and the conductive member 214 for travel paths of the same length.

However, where the contact elements 314 and the conductive pad 214 are of different resistivities, then the mean travel path of the current through the conductive pad 214 will be significant as it affects the total resistance of the circuit. In the present invention the resistivity of the conductive pad 214 (or more precisely its conductive surface layer) is appreciably higher than that of the contact elements 314, so that the lower the length of the mean travel path of current through the conductive pad 214, the lower the resistance across the sensor 210. Resistivity ratios of 1000:1 to 1,000,000:1 are preferred.

It has been found that the electrical resistance of the circuit is more nearly proportional to the compressive force applied to the sensor when the electrical resistance reflects not only the increase in area of surface contact created by the compressive load, but also by a decrease in the mean travel path of current through the conductive pad 214 as a result of that load. Furthermore, as the relative resistivity of the contact elements 314 and the conductive pad 214 may be easily adjusted simply by modifying the resistivity of the conductive pad 214 (perhaps by applying a more or less conductive acrylic paint, or a thicker or thinner coating thereof, to the base elastomer), fine-tuning of the proportionality is possible.

The manner of use of the second embodiment is identical with that of the first embodiment and hence need not be described herein.

While the electrical resistance of the circuit remains an exponential function of the compressive load applied to the sensor even in the second embodiment, the results can be made more meaningful by virtue of the fact that there are two components acting on the electrical resistance—namely, the change in the area of surface contact and the change in the length of the mean travel path of current through the conductive pad. Through appropriate adjustment of these two components, the steep and substantially linear portion of the exponential curve may be made more arcuate so as to enable better resolution of the curve.

The second embodiment of the present invention has been discussed exclusively in terms of a conductive pad 214 which had a higher resistivity than the contact elements 314; nonetheless, it should be appreciated that the resistivity of the contact elements 314 may be equal to or greater than that of the conductive pad 214, if desired. Where the resistivities are equal, the change in the length of the mean travel path of current through the conductive pad 214 does not effect the electrical resistance of the circuit as a whole and thus is of no importance. Where the resistivity of the contact elements 314 is greater than that of the conductive pad 214, the change in the length of the mean travel path of the current through the circuit may affect the electrical resistance of the circuit. The resistivity of the contact elements 314 may be varied by conventional means; e.g., by coating the same (or at least the upper surfaces thereof) with semiconductive material. The geometric pattern 315 of insulation will, of course, be varied in this case to meet the needs of the particular application as particular applications will require a geometric pattern substantially different from the diamond pattern shown and described hereinabove. While the disposable conductive pads 14, 114, 214 must be relatively inexpensive, their proper functioning is vital to the dynamic accuracy of the overall sensor. Thus, the conductive pads must deform rapidly under the applied compressive load and then resiliently return to their original configuration without exhibiting any hysteresis. As earlier noted, it is also necessary for the conductive pad to provide a suitable surface for adhesion by the various double adhesive layers 40, 46 or 42, 48 or 50, 52, their counterparts in other embodiments, and preferably even the use of single adhesive layers in place of the double adhesive layers.

Figure 24:
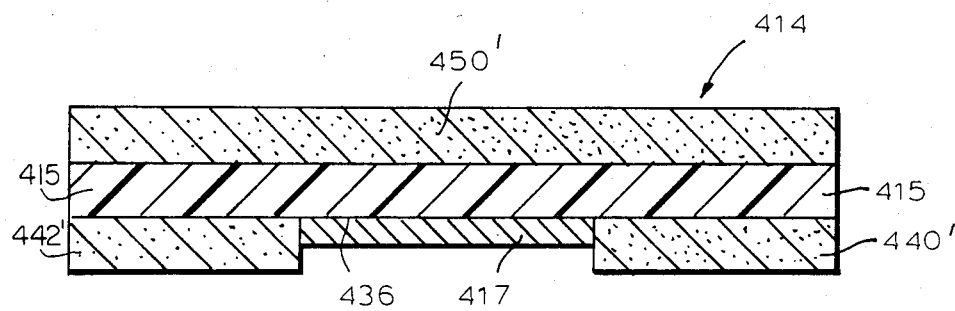
FIG. 24 is a sectional view of another embodiment of the sensor pad.

Referring now to FIG. 24 in particular, therein illustrated is a novel disposable conductive sensor pad generally designated by the numeral 414. The adhesive portions of the pad 414 are similar to those of the first and second embodiments, except that instead of double layers of double-sided adhesive interface tape 40, 46 or 42, 48 or 50, 52, a single strip 440′, 442′ or 450′ of double-sided adhesive interface tape replaces the pairs. Pad 414 is formed of a thin flexible plastic film 415 coextensive therewith and generally having a thickness of about 5–10 mils. The plastic layer 415 is formed of polyester, acetate, kapton, vinyl, or the like and is preferably a polyester film available from DuPont under the designation MYLAR. Intermediate the adhesive layers 440, 442, the inner or lower face 436 of the plastic layer 415 is coated with a conductive ink or paint 417. The use of conductive inks or paints is well known in the art, and they may be conventionally applied using a silk screen process to provide a coating generally about 2 mils in thickness. Typical conductive inks or paints comprise an acrylic—or epoxy-based binder (which also acts as an adhesive) containing suspended therein particles of a conductive element such as graphite, silver, etc. The conductive ink or paint layer 417 forms the conductive lower surface of the sensor pad 414. It will be appreciated that, if desired, the conductive layer 417 may be coextensive with the plastic layer 415 and that pairs of double-sided adhesive interface strips may be used in place of the single double-sided adhesive interface strips 440′, 442′, 450′.

Figure 25:
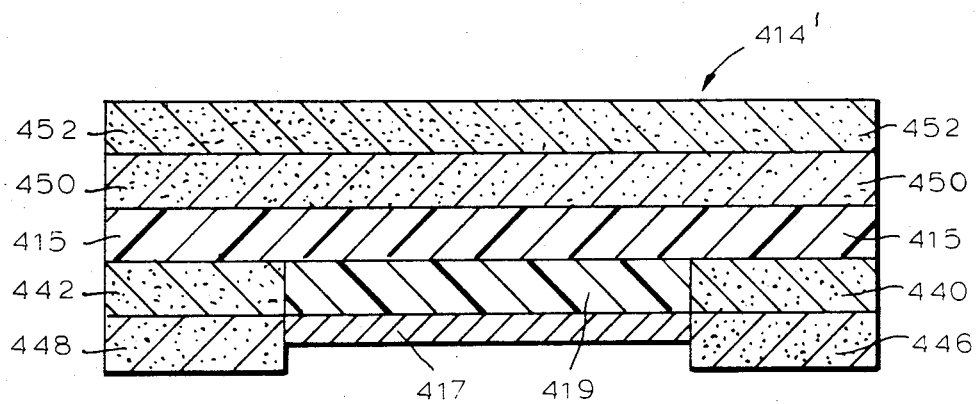
FIG. 25 is a sectional view of a variant of that embodiment of the sensor pad.

Referring now to FIG. 25 in particular, therein illustrated is a variant 414′ of the disposable conductive sensor pad 414. The adhesive portions of this embodiment utilize double layers 440 and 446, 442 and 448, and 450 and 452 in place of the single layers of double-sided interface adhesive tape 440′, 442′, 450′ as shown in the main embodiment 414. If desired, however, corresponding single layers of double-sided adhesive interface tape may be utilized. The thin plastic layer 415 and the conductive paint or ink layer 417 are similar to those found in the main embodiment 414, except that a relatively thin layer 419 of a flexible, compressible elastomeric material is interposed between the layers 415, 417. The elastomeric layer 419 may be formed of neoprene, urethane or a variety of foamed materials and generally has a thickness of 10–32 mils. The elastomeric layer 419 not only provides additional comfort by introducing a cushioning material intermediate the user's foot and the relatively rigid electrodes therebelow, but assists the sensor pad, and in particular the conductive layer 417, to enter positioning means 22 or access means 310, especially where the load-applying portion of the user's foot is relatively rigid and non-deformable.

While there have been shown and described and pointed out the fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

I claim:

1. For use with a sensor comprising a body having spaced electrodes, a conduction sensor pad comprising a sheet of flexible conductive material having upper and lower faces and shaped to be received on said sensor body and to span the space between said electrodes, said lower face of said sheet being adapted to be secured to said sensor body and having adhesive portions to engage said body, said adhesive portions being spaced from one another at a location corresponding to the space between said electrodes, said upper face of said sheet having an adhesive portion adapted to be secured to a test site on the person of an individual.

2. The sensor pad of claim 1, in which said adhesive portions respectively comprise double-sided adhesive tapes.

3. The sensor pad of claim 2, in which at least one of said adhesive portions comprises two superposed layers of double-sided adhesive tape.

4. The sensor pad of claim 1, in which said sheet is formed of carbon-impregnated silicone rubber.

5. The sensor pad of claim 1, in which said sheet is formed of an insulative rubber having a conductive coating operatively disposed on the lower face thereof intermediate said adhesive portions.

6. The sensor pad of claim 5, in which said insulative rubber is neoprene and said conductive coating is a conductive acrylic.

7. The sensor pad of claim 1, in which said sheet comprises a thin flexible plastic film having a coating of conductive ink disposed on the lower face thereof intermediate said adhesive portions.

8. The sensor pad of claim 7 wherein said plastic film is formed of an insulative polyester.

9. The sensor pad of claim 1 in which said sheet is a laminate comprising a thin flexible plastic layer defining the upper face of said sheet, a thin flexible conductive layer defining the lower face of said sheet intermediate said adhesive portions, and a thin flexible compressible elastomeric layer disposed intermediate said plastic layer and said conductive layer.

10. The sensor pad of claim 9, in which said adhesive portions respectively comprise double-sided adhesive tapes.

11. The sensor pad of claim 10, in which at least one of said adhesive portions comprises two superposed layers of double-sided adhesive tape.

12. A sensor comprising a member of dielectric material defined by inner and outer faces; at least one spaced pair of electrical contact means on said inner face of said dielectric member; electrical lead means electrically coupled to each of said pair of contact means; and a flexible conductive member operatively connected to said dielectric member and having an inner face overlying the inner face of said dielectric member to cover said contact means;

said sensor being characterized by said pair of contact means defining therebetween a geometric dielectric pattern; said conductive member having an electrical resistivity different from that of said contact means and being adapted for movement into and out of increased engagement with said contact means on opposite sides of said pattern in response to a variation in the compressive load applied to said sensor; and said pair of contact means being configured and dimensioned such that, when a compressive load is applied to said sensor, the load induces a variation in the mean length of the travel path of current between said contact means of said pair through said conductive member.

13. A force sensor comprising a disposable, flexible, relatively thin, planar, electrically conductive member; a permanent, flexible, relatively thin member of dielectric material, one face of which is substantially planar and adapted to be detachably affixed to one planar face of said conductive member; at least one spaced pair of electrical contact means on said one face of said dielectric member; electric lead means electrically coupled to each of said pair of contact means; means on said dielectric member for positioning said contact means facing said one planar face of said conductive member such that the extent of electrical contact between said contact means and conductive member varies in accordance with the extent of a compressive load applied to said sensor to produce a corresponding electrical resistance therebetween; and means joining said conductive and dielectric members together and being releasable to permit their separation and the disposal of said conductive member;

said sensor being characterized by each said pair of contact means defining therebetween a geometric dielectric pattern and being covered by said one planar face of said conductive member, and said conductive member being adapted for movement into and out of increased engagement with said contact means on opposite sides of said pattern in response to variations in the extent of a compressive force applied to said sensor to produce a corresponding electrical load across said electrical lead means.

14. A force sensor comprising a thin, flexible permanent electrode having at least one spaced pair of electrical contact means supported thereon; a thin, flexible conductive sensor pad having a flexible conductive member defined by two faces; adhesive means disposed on one face of said sensor pad to electrically join same to a test site; and adhesive means disposed on the other face of said sensor pad to releasably affix the same to said permanent electrode and to define a non-adhesive zone thereon, said permanent electrode being oriented with respect to said other face of said sensor pad so as to place said contact means in facing opposition to said non-adhesive zone such that when a compressive load is applied across the sensor, the load induces a change in the surface area of contact between facing portions of said non-adhesive zone and said contact means to correspondingly vary the electrical resistance thereacross;

said sensor being characterized by said contact means having a different electrical resistivity than said non-adhesive zone, each said pair of contact means defining therebetween a dielectric pattern in the shape of a diamond, and said non-adhesive zone being adapted for movement into and out of increased engagement with said contact means on opposite sides of said pattern in response to an increase or decrease of the compressive force applied to said sensor, such that, when the compressive load on said sensor is changed, the load also induces a change in the mean length of the travel path of current between said contact means of said pair through said non-adhesive zone.

15. A pressure transducer comprising a dielectric electrode platform; at least one spaced pair of electrical contact means on said platform; a flexible conductive member facing said contact means so that the same move into varying extents of engagement in accordance with a pressure applied to the same to effect an electrical resistance that is an inverse function of the pressure applied to the same; electrical leads connected with said transducer to permit the transmission of said electrical resistance, said electric lead means being electrically coupled to each of said contact means of said pair;

said transducer being characterized by each said pair of contact means defining therebetween a geometric dielectric pattern having a periphery sloping towards the centerline of said pair of contact members as the periphery approaches the ends of the centerline, and said conductive member being adapted for movement into and out of increased engagement with said contact means on opposite sides of said pattern in response to an increase or decrease of the compressive force applied to said sensor, such that, when a compressive load is applied to said transducer, the load also induces a variation in the mean length of the travel path of current between said contact members of said pair through said conductive member and so change the electrical resistance across said contact means in proportion to the extent of the applied load.

16. The product of any of claims 12-15 wherein said conductive member has a different electrical resistivity than said contact means; and said pair of contact means is configured and dimensioned such that, when a compressive load is applied to said sensor, the load induces an increase in the surface area of contact between facing portions of said conductive member and said contact means, thereby to effect a variation in the mean length of the travel path of current between said contact members of said pair through said conductive member and so change the electrical resistance across said contact means in proportion to the extent of the applied load.

17. The product of claim 16 wherein said conductive member has a greater electrical resistivity than said contact means, and the variation in the mean travel path of the current is a decrease.

18. The product of any of claims 12-14 wherein said geometric dielectric pattern has a periphery sloping towards the centerline of said pair of contact means as the periphery approaches the ends of the centerline.

19. The product of any of claims 12, 13 and 15 wherein said geometric dielectric pattern is configured as a diamond.

20. The product of any of claims 12-15, wherein said conductive member is comprised of an insulative rubber and has on its inner face an electrically conductive coating.

21. The product of claim 20, wherein said flexible conductive member comprises an acrylic coated neoprene.

* * * * *